United States Patent
Lee et al.

(10) Patent No.: US 11,042,050 B1
(45) Date of Patent: Jun. 22, 2021

(54) POLARIZATION SPLITTER-ROTATOR WITH EMBEDDED PIN STRUCTURE

(71) Applicant: Cisco Technology, Inc., San Jose, CA (US)

(72) Inventors: Yi Ho Lee, Breinigsville, PA (US); Ming Gai Stanley Lo, Breinigsville, PA (US); Vipulkumar K. Patel, Breinigsville, PA (US); Prakash B. Gothoskar, Allentown, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/708,248

(22) Filed: Dec. 9, 2019

(51) Int. Cl.
*G02B 6/10* (2006.01)
*G02F 1/025* (2006.01)
*G02B 6/27* (2006.01)
*G02F 1/015* (2006.01)

(52) U.S. Cl.
CPC ............ *G02F 1/025* (2013.01); *G02B 6/2766* (2013.01); *G02B 6/2773* (2013.01); *G02F 1/0152* (2021.01)

(58) Field of Classification Search
CPC ............. G02F 1/025; G02F 2001/0152; G02B 6/2766; G02B 6/2773
See application file for complete search history.

(56) References Cited

U.S. PATENT DOCUMENTS

| | | | |
|---|---|---|---|
| 8,873,899 B2 | 10/2014 | Anderson et al. | |
| 9,239,506 B2* | 1/2016 | Manouvrier | G02F 1/025 |
| 9,915,781 B1* | 3/2018 | Lin | G02B 6/14 |
| 2010/0158426 A1* | 6/2010 | Manipatruni | G02F 1/2257 385/2 |
| 2016/0313505 A1* | 10/2016 | Ma | G02F 1/025 |
| 2016/0380121 A1* | 12/2016 | Suzuki | G02F 1/025 385/2 |
| 2017/0068048 A1* | 3/2017 | Kamei | G02B 6/2861 |

OTHER PUBLICATIONS

H. Rong et al., An all-Silicon Raman Laser, Nature 433(7023), pp. 292 (2005).
T. K. Liang, and H. K. Tsang, Role of free carriers from two-photon absorption in Raman amplification in silicon-on-insulator waveguides,Appl. Phys. Lett. 84(15), 2745???2747 (2004). (Abstract Only).

* cited by examiner

*Primary Examiner* — Ellen E Kim
(74) *Attorney, Agent, or Firm* — Patterson + Sheridan, LLP

(57) ABSTRACT

Embodiments herein describe reverse biasing one or more PIN junctions formed in at least one layer of a PSR. The resulting electric fields in the PIN junctions overlap with the optical path of the optical signal and sweep away photogenerated hole-electron free carriers away. That is, the electric fields in the PIN junctions remove the free carriers from the path of the optical signal and reduces the population of the free carriers, thereby mitigating the negative impact of free-carrier absorption (FCA).

20 Claims, 7 Drawing Sheets

POLARIZATION SPLITTER-ROTATOR WITH EMBEDDED PIN STRUCTURE

TECHNICAL FIELD

Embodiments presented in this disclosure generally relate to reverse biasing a Polarization Splitter-Rotator (PSR). More specifically, one or more waveguide layers in the PSR include PIN junctions that are reversed biased during operation.

BACKGROUND

For high optical power photonic telecommunication applications (for example coherent and in-package optics), a silicon photonic platform needs a solution to minimize optical losses due to free-carrier absorption (FCA) induced by two-photon absorption (TPA) in silicon waveguides.

PSR is a component in a photonic chip that rotates and splits an input polarized signal received from an optical source and is typically located in the front end of an optical link in the photonic chip. Because the PSR is in the front end, it sees a large amount of optical power. Without a way to mitigate FCA, excessive optical losses in the PSR can limit the functionality and reliability of the photonic chip.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a PSR that includes an input waveguide configured to receive an optical signal comprising transverse electric (TE) light and transverse magnetic (TM) light and a first biased layer optically coupled to the input waveguide where the first biased layer converts the TM light into TE light. The first biased layer includes a PIN junction including a waveguide configured to propagate the optical signal received from the input waveguide through the PSR where the PSR is configured to reverse bias the PIN junction during operation.

A photonic chip including an optical interface configured to receive an optical signal comprising two modes of light and a PSR optically coupled to the optical interface, the PSR including at least one PIN junction forming a waveguide through which the optical signal propagates where the PSR is configured to reverse bias the PIN junction during operation.

Example Embodiments

Embodiments herein describe reverse biasing one or more PIN junctions formed in at least one waveguide layer in a PSR. FCA induced by TPA can create non-linear power loss where higher power optical signals are disproportionately negatively impacted relative to lower power optical signals. At wavelengths generally used for telecommunication (e.g., 1200-1700 nm), TPA can generate free carriers above a critical power density in a silicon waveguide. These photo-generated hole-electron free carriers induce optical losses through a free carrier plasma dispersion effect, known as FCA.

To reduce the negative impact of FCA, the embodiments herein include a reverse biased PIN junction in at least one layer of a PSR. The resulting electric field in the PIN junction overlaps with the path of the optical signal and sweeps away photo-generated hole-electron free carriers from the waveguide transmitting the optical signal. That is, the electric field in the PIN junction removes the free carriers from the waveguide, thereby reducing the population of the free carriers and mitigating the negative impact of FCA.

In one embodiment, the PSR includes multiple layers where each layer includes a reverse biased PN junction. However, in other embodiments, one of the layers includes a reverse biased PN junction while the other layer or layers contain a passive (i.e., unpowered) waveguide. Further, while FCA has a greater negative impact on optical efficiency in silicon waveguides when using wavelengths typical to telecommunications, the embodiments herein are not limited to silicon and can be used to form reverse biased PIN junctions in PSRs implemented using different materials (e.g., indium phosphide, polysilicon, or nitrides).

Figure 1:
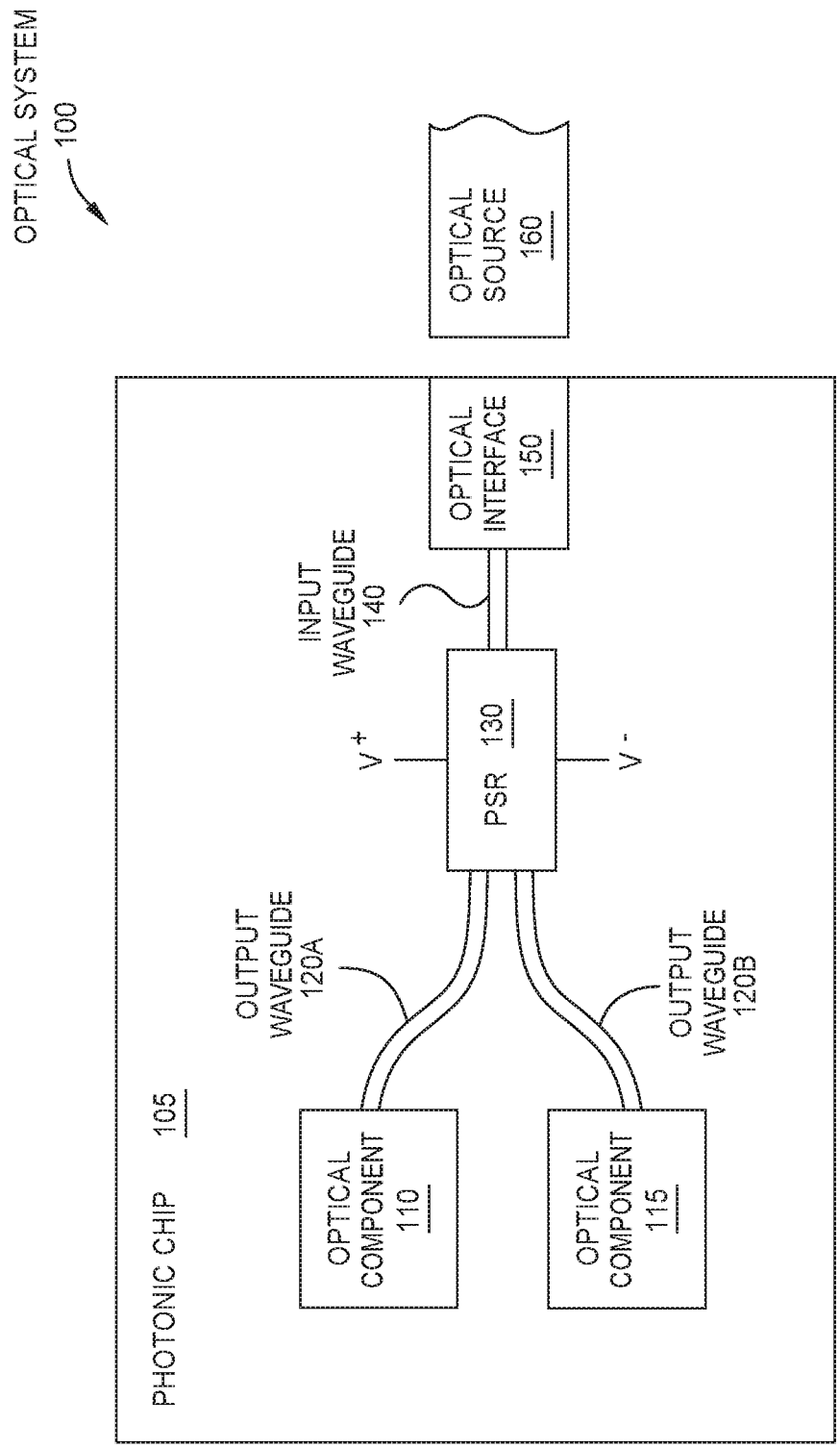
FIG. 1 illustrates an optical system with a reverse biased PSR, according to one embodiment.

FIG. 1 illustrates an optical system 100 with a reverse biased PSR 130, according to one embodiment. The optical system 100 includes a photonic chip 105 that is optically coupled to an optical source 160 (e.g., an optical cable or fiber). As mentioned above, the optical source 160 may transmit a high power optical signal (e.g., greater than 10 dBm) which is negatively impacted by FCA when transmitted into the photonic chip 105, which may be formed using a semiconductor substrate such as silicon.

The photonic chip 105 includes an optical interface 150 for receiving the optical signal from the optical source 160. Here, the optical source 160 is butt coupled to the to the photonic chip 105 via the interface 150; in other embodiments, the optical source 160 may be evanescently coupled to the photonic chip 105. In one embodiment, the size of the optical mode of the incoming signal may be much larger than the size of waveguides 120A-B, 140 in the photonic chip 105. As such, the optical interface 150 may be a spot size converter for changing the dimensions of the optical mode to better match the dimensions of the waveguides in the photonic chip 105 (e.g., submicron waveguides). In addition to the optical interface 150, the optical system 100 may also include lenses or other focusing elements to transmit the optical signal from the optical source 160 into the optical interface 150.

The optical interface 150 transmits the optical signal received from the optical source 160 into an input waveguide 140 for the PSR 130. The PSR 130 receives the optical signal and converts any transverse magnetic (TM) light into transverse electric (TE) light. That is, because the optical signal is received from an external source via the optical source 160 (e.g., another optical system), the photonic chip 105 may not be able to guarantee that the optical signal has the desired polarization (TE in this case). That is, some of the optical signal may have a TM polarization. Instead of filtering out the light with TM polarization, the PSR 130 converts the TM polarized light into TE polarized light so that the entire optical signal can be transmitted to, and used by, optical components 110, 115 in the photonic chip 105 (e.g., optical modulators, filters, amplifiers, photodetectors, and the like) which are designed for TE polarized light. As a result, the PSR 130 outputs respective TE polarized optical signals at output waveguides 120A and 120B.

Although typical PSRs 130 are passive (e.g., unpowered), the PSR 130 includes at least one PIN junction in a waveguide layer that is reversed biased. That is, a voltage is provided to the PSR 130 (represented by V+ and V−) which reverse biases the PIN junction. In one embodiment, the electric field generated by reverse biasing the PIN junction overlaps with the optical mode of the optical signal received from the input waveguide 140. This electric field sweeps out the free carriers generated from TPA which mitigates the negative impact of FCA in the photonic chip 105. The details of the PSR 130 are shown in more detail in the figures that follow.

Figure 2:
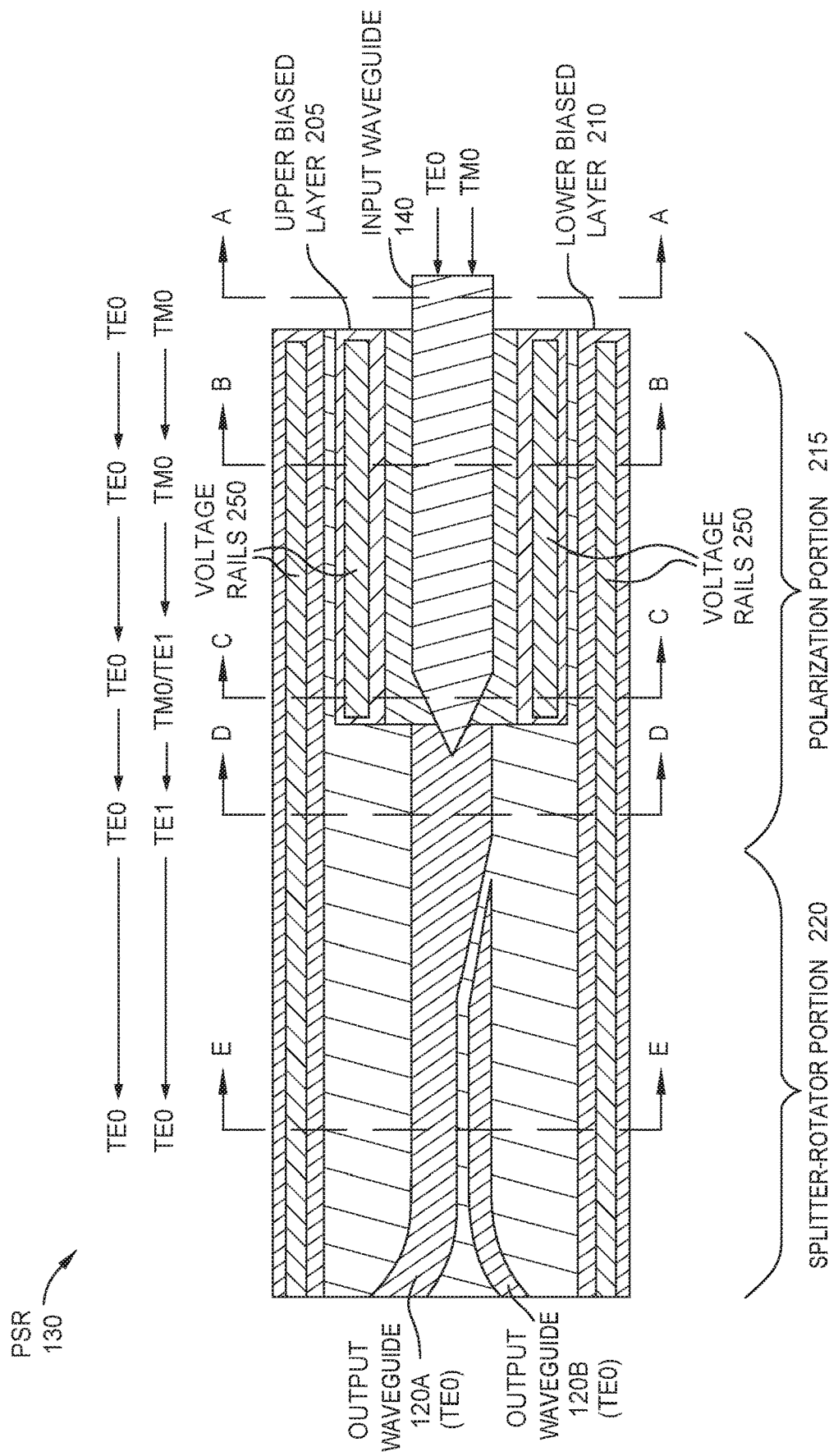
FIG. 2, illustrates a top view of a reverse biased PSR, according to one embodiment.

FIG. 2, illustrates a top view of a reverse biased PSR 130, according to one embodiment. The right side of the PSR 130 receives an optical signal using the input waveguide 140. As shown, this optical signal includes both TE0 and TM0 optical modes. However, TE0 and TM0 are just some examples of optical modes. In other scenarios, the optical signal received by the PSR 130 can include different modes of TE and TM polarized light.

The optical signal propagating in the input waveguide 140 is transferred from the input waveguide 140 into an upper biased layer 205 as the optical signal moves from right to left in the PSR 130. As shown in more detail in later figures, the upper biased layer 205 includes a PIN junction through which the optical signal propagates. The PIN junction is reverse biased using direct current (DC) voltages applied on voltage rails 250.

The PSR 130 also includes a lower biased layer 210 where the upper biased layer 205 transfers the optical signal into the lower biased layer 210 as the optical signal continues to propagate from right to left in the PSR 130. Like the upper biased layer 205, the lower biased layer 210 also includes a PIN junction through which the optical signal propagates. This PIN junction is also reversed biased using the rails 250. As a result, the free carriers generated by TPA as the optical signal propagates in the upper and lower biased layers 205, 210 are swept away from the waveguides in the reverse biased PIN junctions.

FIG. 2 indicates the polarization of the optical signal at various cross sectional locations of the PSR 130 (A-A-E-E). The cross section A-A corresponds to a location where the PSR 130 receives the optical signal from the upstream optical components such as the optical interface or optical source. In this example, the optical signal includes light in the TE0 optical mode and in the TM0 optical mode. To convert the TM0 polarized light to TE, the PSR 130 includes a polarization portion 215 comprising the input waveguide 140, the upper biased layer 205, and a portion (e.g., half) of the lower biased layer 210. As the optical signal propagates from right to left, the optical signal is transferred from the input waveguide 140 to the upper biased layer 205. However, at the location of the cross section B-B, the optical signal still contains TE0 and TM0 polarized light. Moving further to the left, at the location of the cross section C-C some of the TM0 polarized light is converted into TE1 polarized light, although some of the light remains in the TM0 mode. In addition, the tapering of the various features in the upper biased layer 205 and the input waveguide 140 transfers the optical signal into the lower biased layer 210. That is, as the width of a waveguide in the upper biased layer 205 decreases, the width of an underlying waveguide in the lower biased layer 210 increases. This tapering forces the optical signal from the waveguide in the upper biased layer 205 into the waveguide in the lower biased layer 210 which is shown in more detail in the figures below.

At the location of the cross section D-D, the input waveguide 140 and the upper biased layer 205 have terminated and the optical signal primarily propagates in the lower biased layer 210. Moreover, the optical signal now contains TE0 and TE1 polarized light, where the light previously having the TM0 polarization has been converted into TE1.

The PSR 130 contains a splitter-rotator portion 220 which rotates the TE1 light into the TE0 mode and splits the optical signal into two TE0 optical signals. Thus, at the location of the cross section E-E, the received optical signal has been converted from one optical signal containing TE0/TM0 polarized light into two TE0 optical signals. The two TE0 optical signals are then respectively outputted from the splitter-rotator portion 220 into the two output waveguides 120A and 120B. In this manner, if the received optical signal has TM polarized light, this light can be converted into TE light in the fundamental mode (i.e., TE0).

In one embodiment, the total length of the PSR 130 in the horizontal direction of FIG. 2 is 200 microns, although the length may be any size, in one embodiment, the length is between 100 microns to 300 microns. In one embodiment, the length varies depending on the system specification and design margins, where a longer PSR 130 improves polarization rotation and splitting but uses a larger footprint in the photonic chip. Further, the length of the splitter-rotator portion 220 and the polarization portion 215 may each be about half of the total length of the PSR 130.

While FIG. 2 illustrates forming reverse biased PIN junctions in both the upper and lower biased layers 205, 210, this is not a requirement. In one embodiment, only the lower biased layer 210 includes a reverse biased PIN junction, or only the upper biased layer 205 includes a reverse biased PIN junction. The layer without the PIN junction can include an unpowered, passive waveguide (which may still taper as shown in FIGS. 2 and 3A-3E).

In another embodiment, the entire lengths of the upper and lower biased layers 205, 210 do not include reversed biased PIN junctions. That is, rather than the PIN junction extending along the entire length of the lower biased layer 210, only the part of the lower biased layer 210 in the polarization portion 215 forms a PIN junction while the part of the layer 210 in the splitter-rotator portion 220 includes one or more waveguides that do not include a PIN junction. For example, because TPA and FCA has more of an impact at the front end of the optical path in the photonic chip, it may be sufficient to use reverse biased PIN junctions only in the polarization portion 215 of the PSR 130.

Figure 3A:
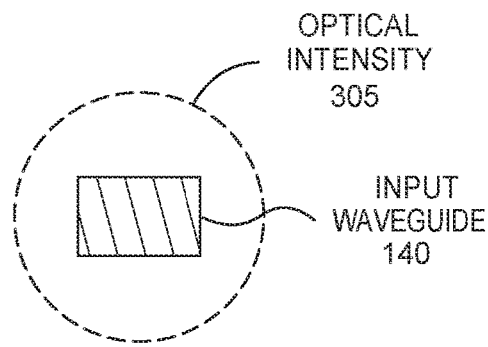
FIGS. 3A-3E illustrate various cross sections of the PSR in FIG. 2, according to one embodiment.

FIGS. 3A-3E illustrate various cross sections of the PSR in FIG. 2, according to one embodiment. FIG. 3A corresponds to the cross section A-A in FIG. 2. As shown, an optical intensity 305 of the optical signal received from the optical source is centered in the input waveguide 140. The input waveguide 140 transmits the optical signal from the optical interface of the chip to the PSR. As mentioned above, the optical signal may include both TM and TE polarized light.

Figure 3B:
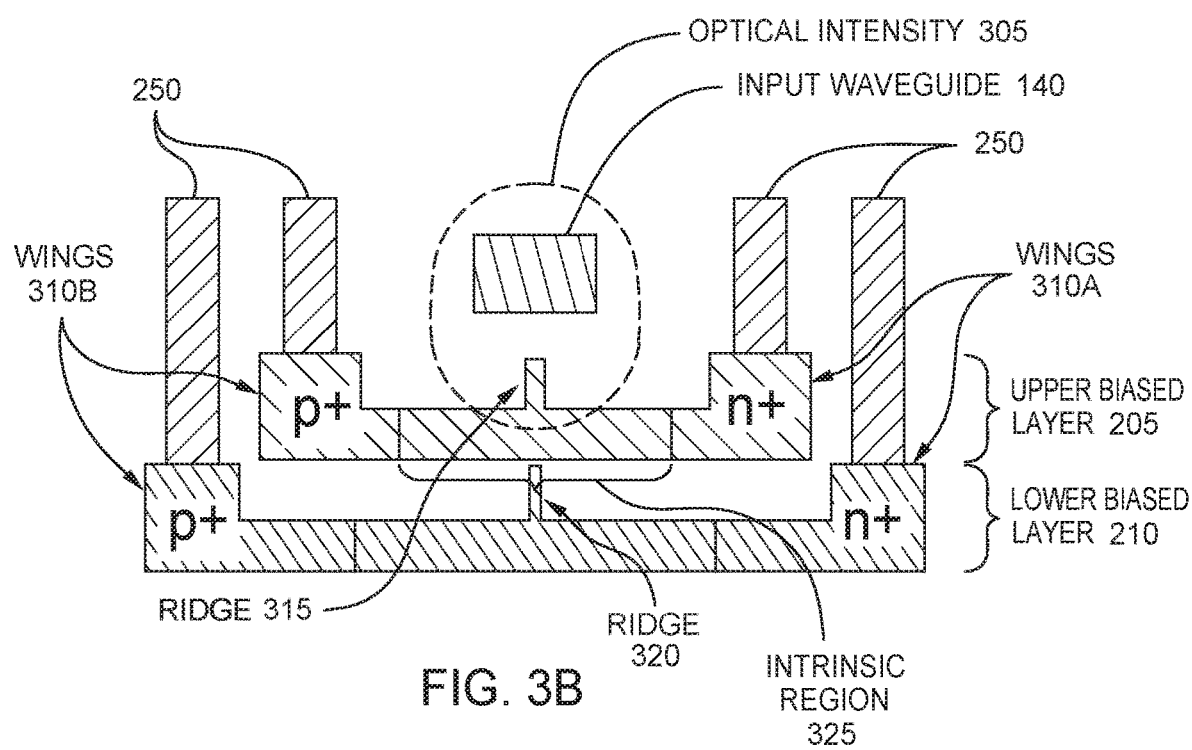

FIG. 3B corresponds to the cross section B-B in FIG. 2. In addition to the input waveguide 140, FIG. 3B also illustrates cross sections of the upper biased layer 205 and the lower biased layer 210. As shown, the layers 205 and 210 both have respective wings 310A and 310B disposed on opposite sides. In this example, the wing 310A is heavily doped with an N-type dopant while the wings 310B are heavily doped with a P-type dopant. The portions of the layers 205, 210 between the wings may include an intrinsic region 325 that includes little or no dopant. In this manner, respective PIN junctions are formed in the layers 205, 210.

The intrinsic regions of the layers 205, 210 both include respective ridges 315, 320 forming, at least in part, waveguides for propagating the optical signal. The width of the ridges 315, 320 help to transfer the optical intensity 305 of the optical signal between the input waveguide 140 and the layers 205, 210. For example, the width of the ridge 320 in the upper biased layer 205 increases from left to right in the PSR 130 shown in FIG. 2. As such, FIG. 3B illustrates that some of the optical signal propagates in the ridge 315 (as indicated by the optical intensity 305 including the ridge 315). Put differently, increasing the width of the ridge 315 along the length of the PSR 130 transfers the optical signal from the input waveguide 140 into the upper biased layer 205.

In one embodiment, the heavily doped regions in the wings 310 are disposed 800 nm to 1 micron away from the edge of the waveguides in the intrinsic region of the PIN junction. That is, to minimize any negative impact of the heavily doped regions on the optical signal propagating in the ridges 315, 320, the width of the layers 205, 210 is controlled so that the wings 310 are not in the portions of the layers 205, 210 serving as waveguides for the optical signal.

The upper and lower biased layers 205, 210 can be made from a plurality of different materials. In one embodiment, both the lower biased layer 210 and the upper biased layer 205 are both form using silicon. In one embodiment, the lower biased layer 210 is polysilicon and the upper biased layer 205 is a crystalline semiconductor (e.g., silicon or a different semiconductor material assuming it is also susceptible to FCA and TPA). In one embodiment, the lower biased layer 210 is a crystalline semiconductor material or polysilicon and the upper biased layer 205 is a nitride (e.g., silicon nitride or silicon oxynitride) or the upper biased layer 205 is crystalline silicon and the lower biased layer 210 is poly-silicon. In another embodiment, both the upper and lower biased layers 205, 210 are formed using crystalline semiconductor materials (e.g., silicon or a III-V semiconductor). In another embodiment, both the upper and lower biased layers 205, 210 are polysilicon. Further, as mentioned above, both of the layers 205, 210 do not need to have reverse biased PIN junctions. For example, if the lower biased layer 210 is crystalline silicon, it may have a PIN junction as shown in FIG. 3B but an upper nitride layer (in the same location as the upper biased layer 205) may not have a PIN junction since nitride is not susceptible to TPA.

The upper and lower biased layers 205, 210 and the input waveguide 140 can be surrounded by a dielectric layer that serves as a cladding so that the optical signal is primarily contained within the upper and lower biased layers 205, 210 and the input waveguide 140. That is, the material of the cladding is selected so that its refractive index ensures that the optical signal is primarily contained in the upper and lower biased layers 205, 210 and the input waveguide 140.

Figure 3C:
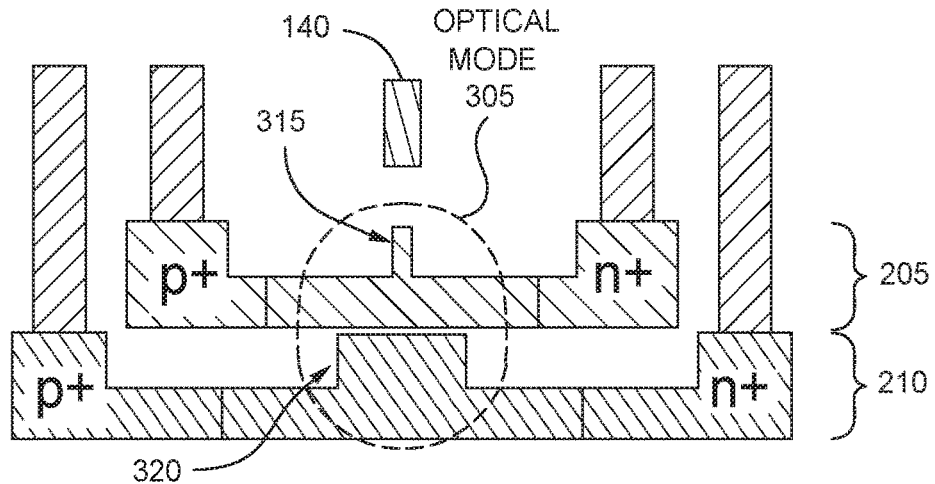

FIG. 3C corresponds to the cross section C-C in FIG. 2. At this location in the PSR 130, the width of the input waveguide 140 has tapered relative to its width at cross sections A-A and B-B. Doing so transfers almost the entire optical signal from the input waveguide 140 into the upper and lower biased layers 205, 210 as indicated by the optical intensity 305. To aid with the transfer, the width of the ridge 320 has increased relative to its width in FIG. 3B. Moreover, as shown by the top view of the PSR 130 between the locations of the cross sections B-B and C-C in FIG. 2, the width of the ridge 315 at the location of the cross section B-B begins to increase (when moving from right to left) until reaching a maximum width and then begins to taper back to substantially the same width at the location of the cross section C-C. Increasing the width of the ridge 315 to a maximum width helps to transfer the optical signal from the input waveguide 140 into the upper biased layer 205. Then decreasing the width of the ridge 315 from its maximum width (which may happen at the same time the width of the ridge 320 increases) helps to transfer the optical signal from the upper biased layer 205 into the lower biased layer 210.

Because in FIGS. 3B and 3C the optical signal is primarily contained in the upper and lower biased layers 205, 210, TPA may generate free carriers in the portion of the layers 205, 210 that overlap with the optical signal as shown by optical intensity 305. However, because a voltage can be applied on the rails 250 that reverse biases the PIN junctions, an electric field is generated in the intrinsic region of the upper and lower biased layers 205, 210 which sweeps the free carriers out of the intrinsic regions (and into the doped wings 310). Put differently, reverse biasing the PIN junctions in the layers 205, 210 removes many of the free carriers generated by TPA from the waveguides in the layers 205, 210 that propagate the optical signal. Doing so mitigates the negative impact of FCA on the efficiency of the optical signal propagating through the PSR 130.

Figure 3D:
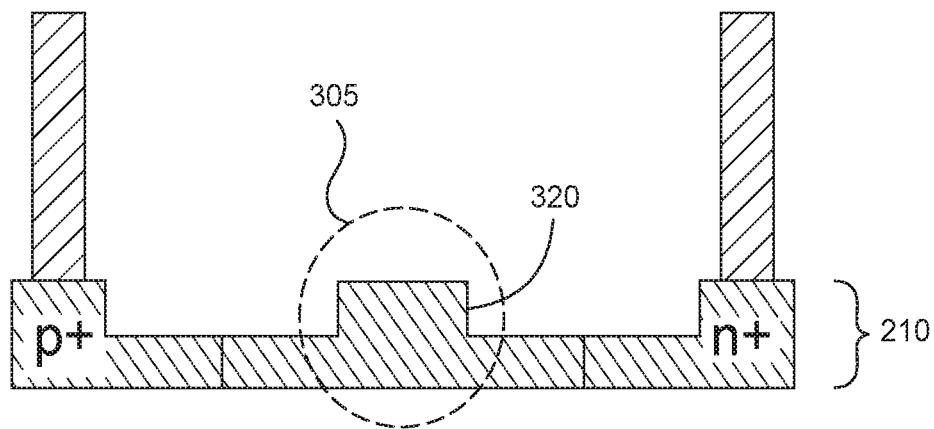

FIG. 3D corresponds to the cross section D-D in FIG. 2. At this location in the PSR 130, the upper biased layer 205 and the input waveguide 140 have terminated while the lower biased layer 210 continues to extend in the PSR 130 in the splitter-rotator portion 220 shown in FIG. 2. As a result, the optical signal is primarily contained within the lower biased layer 210 as shown by the optical intensity 305. Although this portion of the lower biased layer 210 also includes a reverse biased PIN junction, this is not a requirement.

Figure 3E:
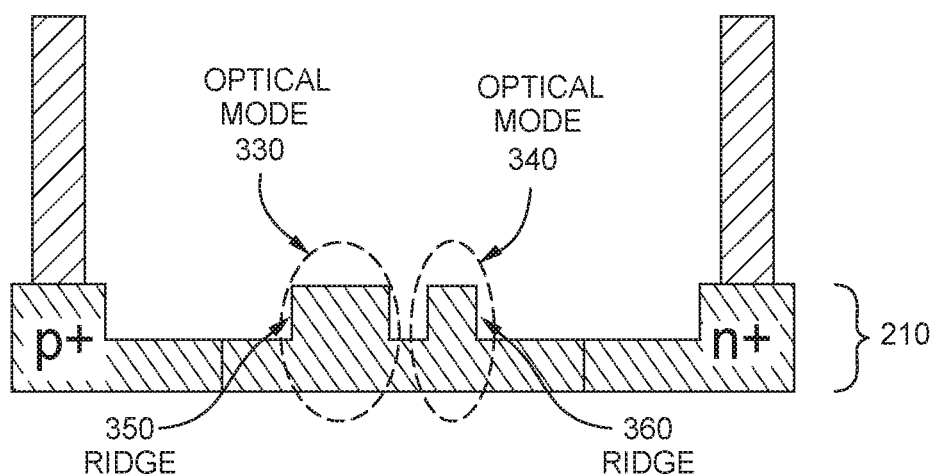

FIG. 3E corresponds to the cross section E-E in FIG. 2. This cross section occurs within a region of the splitter-rotator portion 220 of the PSR 130 where the optical signal is being split (and rotated) into two TE0 mode optical signals represented by the optical mode 330 and optical mode 340. To do so, the lower biased layer 210 has two ridges: ridge 350 and ridge 360. The width of the ridges 350, 360 can be altered along the length of the PSR 130 so that half of the optical power is in the ridge 350 and the other half is transmitted in the ridge 360 at the output of the PSR. However, this is not a requirement. In other embodiments, the power split may be unequally between the ridges 350 and 360. Further, although this portion of the lower biased layer 210 also includes a reverse biased junction to remove the free carriers in and around the ridges 350, 360 (e.g., the intrinsic region of the layer 210), this is not a requirement.

Figure 4A:
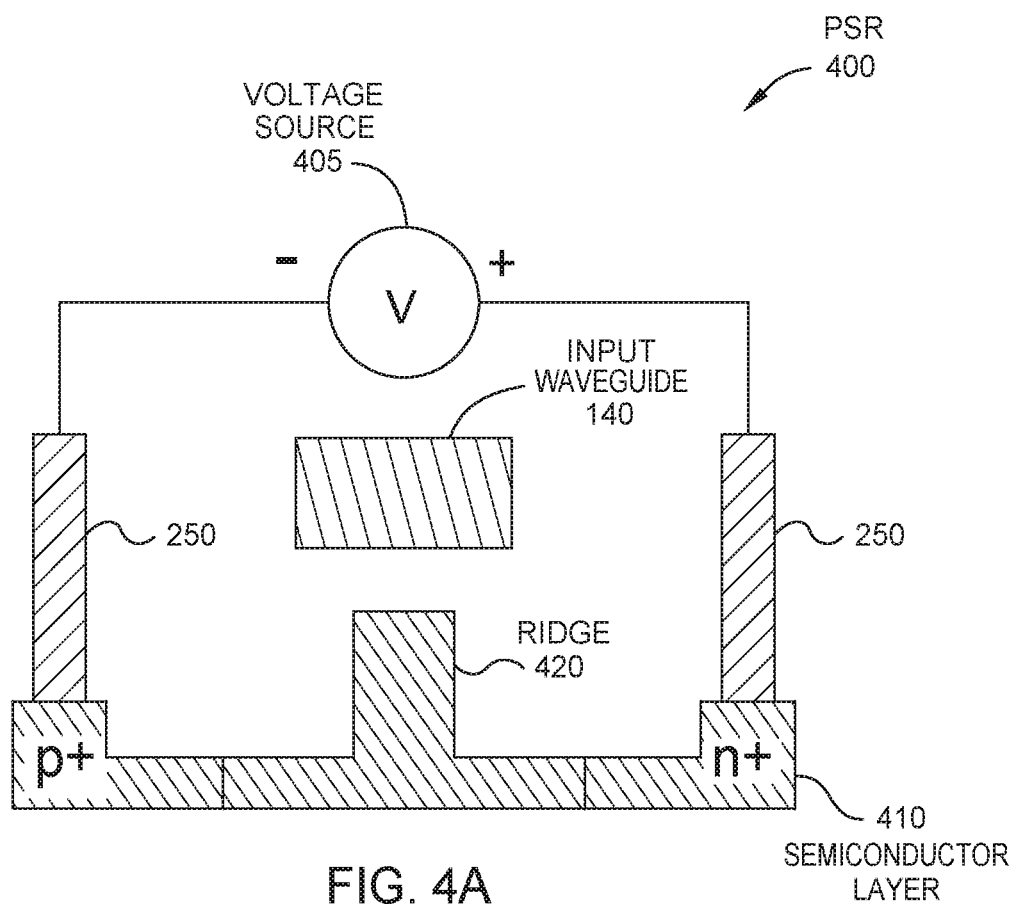
FIGS. 4A and 4B illustrate cross sections of a reverse biased PSR, according to one embodiment.
Figure 4B:
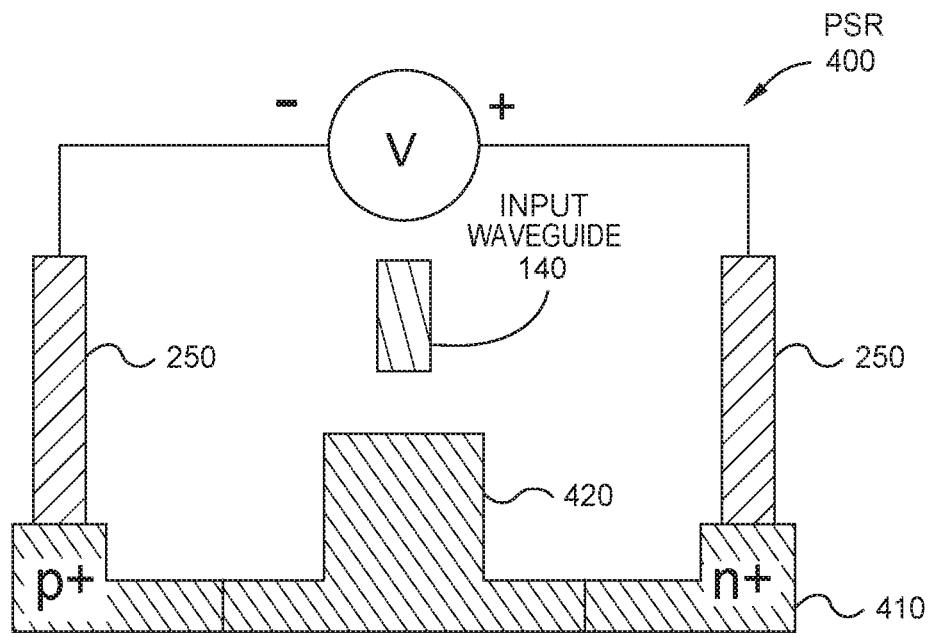

FIGS. 4A and 4B illustrate cross sections of a reverse biased PSR 400, according to one embodiment. As shown in FIG. 4A, the PSR 400 includes a semiconductor layer 410 and the input waveguide 140. Like above, the input waveguide 140 receives an optical signal from an external source (e.g., an optical fiber or cable) that can include both TM and TE polarized light.

Rather than having an upper biased layer between a lower biased layer and the input waveguide 140 like as shown in FIGS. 3B-3D, the PSR 400 has one layer (i.e., the semiconductor layer 410) below the input waveguide 140. The semiconductor layer 410 includes a reverse biased PIN junction as described above with wings containing heavily doped P- and N-type dopants and an intrinsic region between the doped wings that contains a ridge 420. The heavily doped wings of the semiconductor layer 410 are coupled to a voltage source 405 via the rails 250.

FIG. 4B illustrates another cross section of the PSR 400 where the width of the input waveguide 140 has decreased and the width of the ridge 420 has increased. This may be done by gradually tapering the widths as described above in the PSR 130. Doing so transfers the optical signal from the input waveguide 140 down into the semiconductor layer 410, and more specifically, into the ridge 420.

In one embodiment, the cross sections in FIGS. 4A and 4B are part of a polarization portion of the PSR 400 which outputs light in the TE0 and TM0/TE1 modes. The PSR 400 can also include a splitter/rotator portion which has the same structure as the splitter-rotator portion 220 illustrated in FIG. 2 and the cross sections shown in FIGS. 3D and 3E. As a result, like the PSR 130, the output of the PSR 400 is two TE0 optical signals.

In one embodiment, the material of the semiconductor layer 410 is silicon. In another embodiment, the material of the semiconductor layer 410 is a III-V semiconductor such as indium phosphide. In yet another example, while disclosed as a crystalline semiconductor layer 410, this layer 410 may also be doped polysilicon, silicon nitride, or silicon oxynitride.

Figure 5:
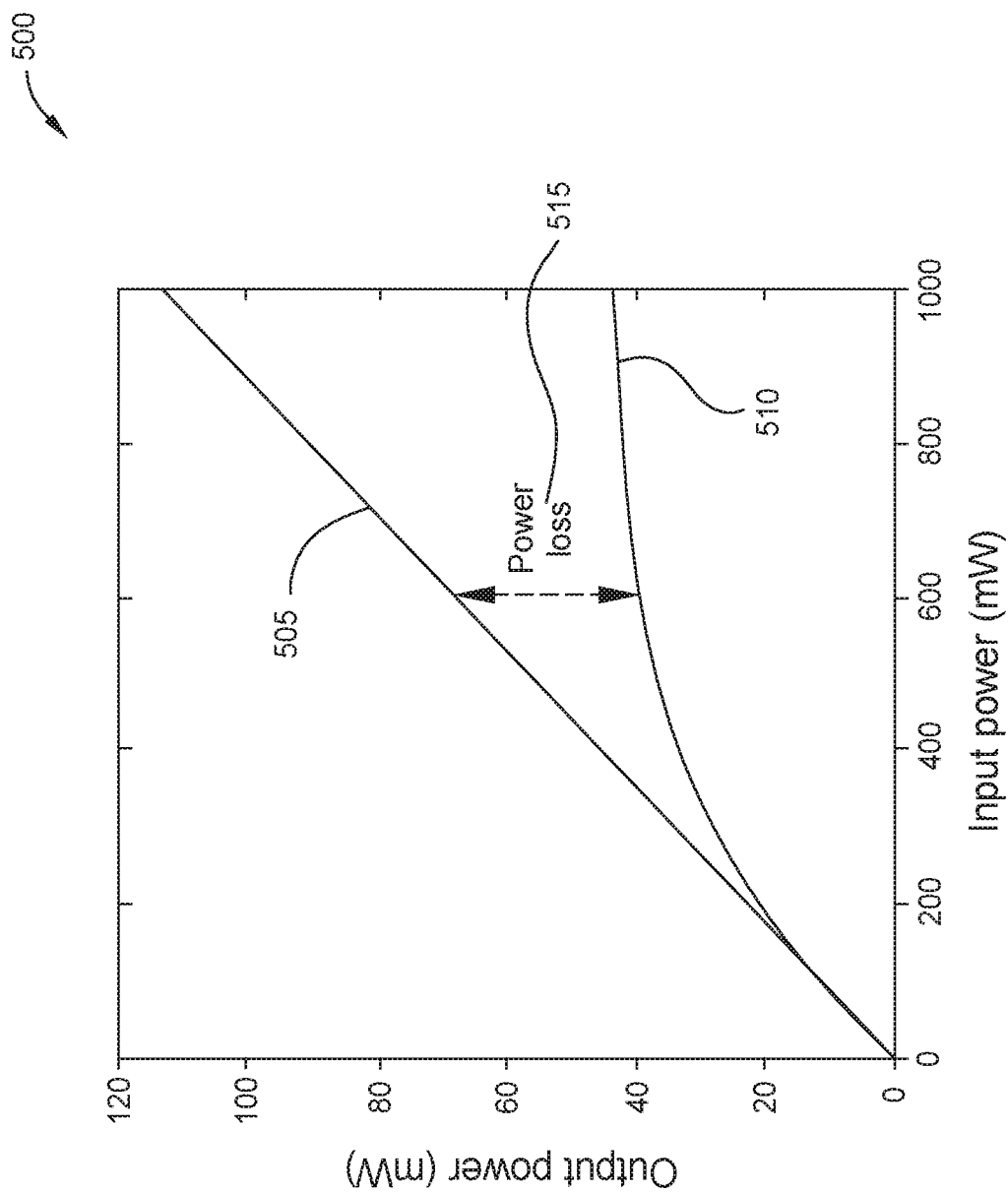
FIG. 5 is a chart illustrating non-linear power loss due to FCA and TPA, according to one embodiment.

FIG. 5 is a chart 500 illustrating non-linear power loss due to FCA and TPA, according to one embodiment. The X-axis of the chart 500 is input power of an optical signal inputted into a semiconductor waveguide. The Y-axis is the output power of the optical signal after traversing the waveguide.

The plot 505 illustrates a linear power loss where the input power and output power has a (desired) linear relationship. That is, as the input power is increased, so does the output power in a directly proportional manner. In contrast, the plot 510 illustrates a non-linear relationship between input and output power. This means that as the input power increases, the output power does not increase linearly. This non-linearity indicates there is a power loss 515 (i.e., the difference between the plot 505 and the plot 510), which becomes greater as the input power increases. This power loss 515 is attributable to FCA that has a greater impact on efficiency as the input power increases. That is, relative to plot 505, FCA causes larger power losses as the input power increases.

Moreover, chart 500 illustrates that FCA has a smaller effect on lower power optical signal. That is, in this particular test system, for signals less than 200 mW, the plot 510 is similar to the ideal (or desired) linear plot 505. However, as the input power increases, FCA creates a larger and larger power loss 515.

Figure 6:
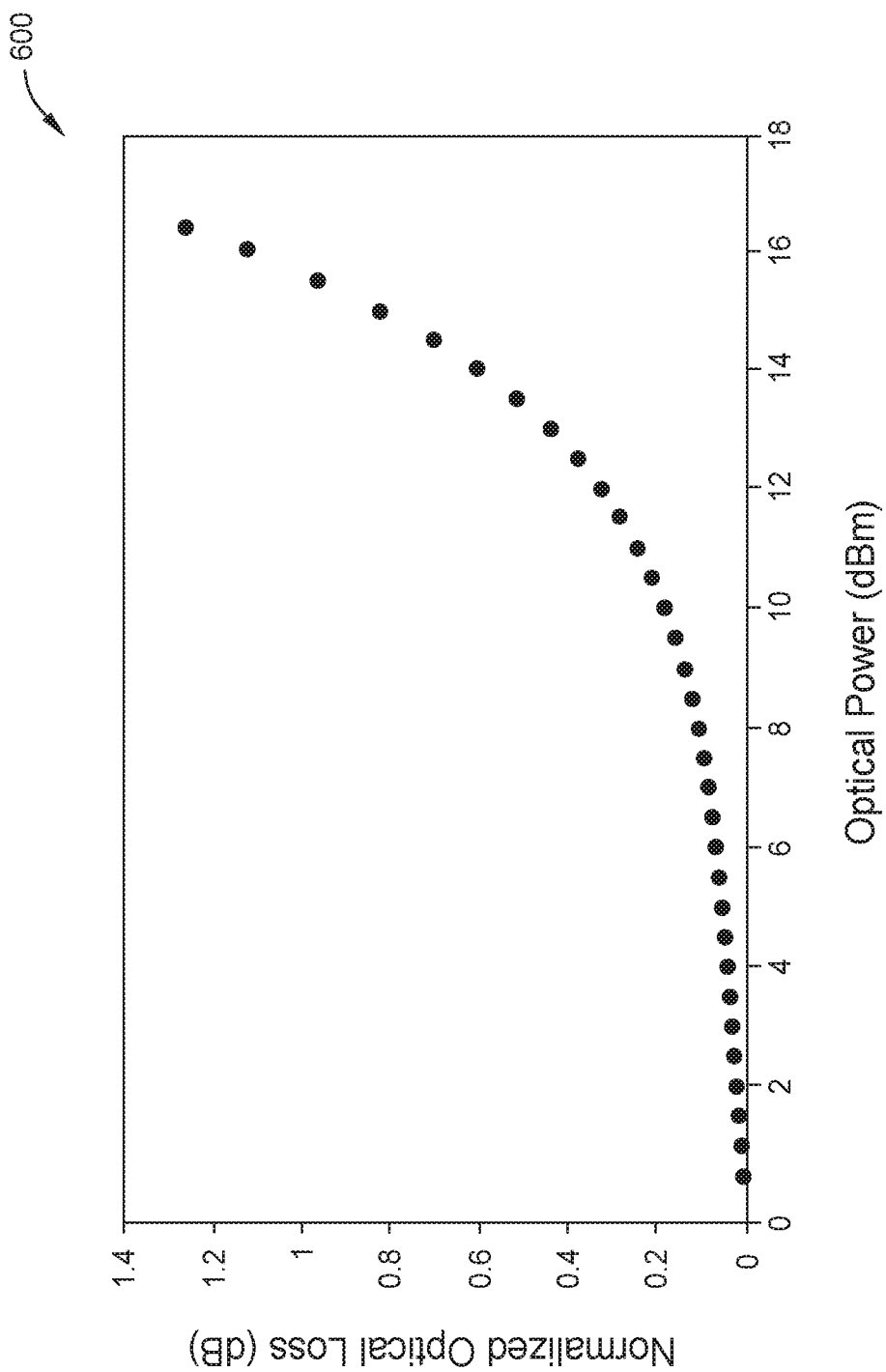
FIG. 6 is a chart illustrating non-linear optical loss in a silicon waveguide, according to one embodiment.

FIG. 6 is a chart 600 illustrating non-linear optical loss in a silicon waveguide, according to one embodiment. That is, the chart 600 illustrates non-linear optical loss in a silicon waveguide. The X-axis is the optical power of the signal inputted in the silicon waveguide while the Y-axis is the normalized optical loss of the optical signal. Chart 600 is derived using an FCA absorption coefficient of $\sim 1.45 \times 10^{-17}$ $N(cm^{-3})$ where the wavelength of the optical signal is 1550 nm.

Chart 600 illustrates that the normalized optical loss is fairly minimal for optical powers between 0 and 10 dBm. However, for optical powers greater than 10 dBm, the optical loss begins to increase exponentially. As such, charts 500 and 600 illustrate the negative impact that FCA has on high power optical signals in a semiconductor material (e.g., silicon). However, FCA can have a similar impact on optical loss for waveguides formed from semiconductor materials different from silicon, albeit these losses may occur at different optical powers and on different wavelengths.

The embodiments discussed above mitigate the optical loss caused by FCA in a waveguide. That is, using reversed biased PIN junctions in a PSR can cause the photonic chip to have a linear relationship between the input and output powers as shown by the plot 505 in chart 500 rather than a non-linear relationship as shown by the plot 510.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. A Polarization Splitter-Rotator (PSR), comprising:
an input waveguide configured to receive an optical signal comprising a first mode and a second mode of light; and
a first biased layer optically coupled to the input waveguide, wherein the first biased layer converts the first mode of light into the second mode of light, the first biased layer comprising a PIN junction comprising a waveguide configured to propagate the optical signal through the PSR,
wherein the PSR is configured to reverse bias the PIN junction during operation.

2. The PSR of claim 1, wherein the first biased layer comprises a ridge disposed in an intrinsic region of the PIN junction, wherein the ridge forms part of the waveguide.

3. The PSR of claim 2, wherein the ridge and the input waveguide extend in a first direction in the PSR, wherein a width of the ridge increases while a width of the input waveguide decreases when moving in the first direction.

4. The PSR of claim 1, wherein the first biased layer comprises a semiconductor material, wherein the input waveguide comprises a different material than the semiconductor material.

5. The PSR of claim 1, wherein the first biased layer comprises a first wing doped with a P-type dopant and a second wing doped with a N-type dopant, wherein the waveguide is disposed between the first and second wings.

6. The PSR of claim 5, further comprising:
voltage rails connected to the first and second wings, wherein the voltage rails apply DC voltages to reverse bias the PIN junction.

7. The PSR of claim 1, wherein the first biased layer comprises:
a polarization portion comprising the PIN junction, wherein the input waveguide overlaps the polarization portion; and
a splitter-rotator portion configured to receive the optical signal from the polarization portion and split the optical signal into two optical signals, both comprising the second mode of light.

8. The PSR of claim 7, wherein the PIN junction extends into the splitter-rotator portion, wherein the first biased layer comprises two ridges in the splitter-rotator portion, wherein the two ridges are disposed in an intrinsic region of the PIN junction.

9. The PSR of claim 7, further comprising:
a second biased layer, wherein the second biased layer comprises a second PIN junction comprising a second waveguide, wherein the second biased layer is disposed between the input waveguide and the first biased layer in the polarization portion of the PSR, wherein the second biased layer optically couples the first biased layer to the input waveguide.

10. The PSR of claim 9, wherein the second biased layer and the input waveguide terminate before reaching the splitter-rotator portion.

11. The PSR of claim 9, wherein the second biased layer comprises a first wing doped with a P-type dopant and a second wing doped with an N-type dopant, wherein the second waveguide is disposed between the first and second wings, the PSR further comprising:
voltage rails connected to the first and second wings, wherein the voltage rails apply DC voltages to reverse bias the second PIN junction.

12. The PSR of claim 11, wherein the second biased layer comprises a second ridge disposed in an intrinsic region of the second PIN junction, wherein a width of the second ridge changes along a length of the PSR to transfer the optical signal from the input waveguide into the first biased layer.

13. A photonic chip, comprising:
an optical interface configured to receive an optical signal comprising two modes of light; and
a PSR optically coupled to the optical interface, the PSR comprising at least one PIN junction forming a waveguide through which the optical signal propagates, wherein the PSR is configured to reverse bias the PIN junction during operation.

14. The photonic chip of claim 13, wherein the PIN junction is formed from a crystalline semiconductor material.

15. The photonic chip of claim 13, wherein the PSR further comprises:
a polarization portion comprising the PIN junction; and
a splitter-rotator portion configured to receive the optical signal from the polarization portion and split the optical signal into two optical signals, both comprising a same mode of the two modes of the light.

16. The photonic chip of claim 15, wherein the PIN junction comprises a ridge forming part of the waveguide, wherein the ridge is disposed between a pair of doped wings, wherein the ridge extends from the polarization portion into the splitter-rotator portion.

17. The photonic chip of claim 15, wherein the PIN junction does not extend into the splitter-rotator portion.

18. The photonic chip of claim 15, wherein the PSR comprises:
an input waveguide coupled to the optical interface; and
a second PIN junction comprising a second waveguide, wherein the second PIN junction is disposed between the input waveguide and the PIN junction in the polarization portion of the PSR, wherein the second PIN junction optically couples the PIN junction to the input waveguide.

19. The photonic chip of claim 18, wherein the second PIN junction and the input waveguide terminate before reaching the splitter-rotator portion.

20. The photonic chip of claim 18, wherein the second waveguide is disposed between a pair of heavily doped wings of the second PIN junction, the PSR further comprising:
voltage rails connected to the pair of heavily doped wings, wherein the voltage rails apply DC voltages to reverse bias the second PIN junction.

* * * * *